United States Patent [19]

McArthur

[11] 4,018,088
[45] Apr. 19, 1977

[54] BOREHOLE PRESSURE MEASUREMENT APPARATUS HAVING A HIGH PRESSURE FLOAT VALVE

[75] Inventor: Billy Walton McArthur, Wallis, Tex.

[73] Assignee: Sperry-Sun Well Surveying Company, Sugar Land, Tex.

[22] Filed: Dec. 8, 1975

[21] Appl. No.: 638,392

[52] U.S. Cl. .................................. 73/151; 73/389; 73/395

[51] Int. Cl.$^2$ ........................................ E21B 47/06

[58] Field of Search ............... 73/151, 395, 388 R, 73/389, 300, 301, 302

[56] References Cited

UNITED STATES PATENTS

| | | | |
|---|---|---|---|
| 804,570 | 11/1905 | Wheeler | 73/300 |
| 2,792,709 | 5/1957 | Bell et al. | 73/302 |
| 3,712,129 | 1/1973 | Rhoades | 73/151 |
| 3,895,527 | 7/1975 | McArthur | 73/151 |

*Primary Examiner* — James J. Gill
*Assistant Examiner* — Anthony V. Ciarlante
*Attorney, Agent, or Firm* — Macka L. Murrah

[57] ABSTRACT

Borehole pressure is measured with an open-ended chamber positioned in the borehole and in fluid communication with a surface pressure source through a microtube. The chamber contains a ball float that seats in the upper end of the chamber to seal the microtube to entry of borehole fluids. The ball is made of a material having a density greater than that of the borehole fluids in order that the float can withstand high pressures. Partial support to compensate for the high density material of the float is provided by a spring attached between the chamber and the float ball.

7 Claims, 3 Drawing Figures

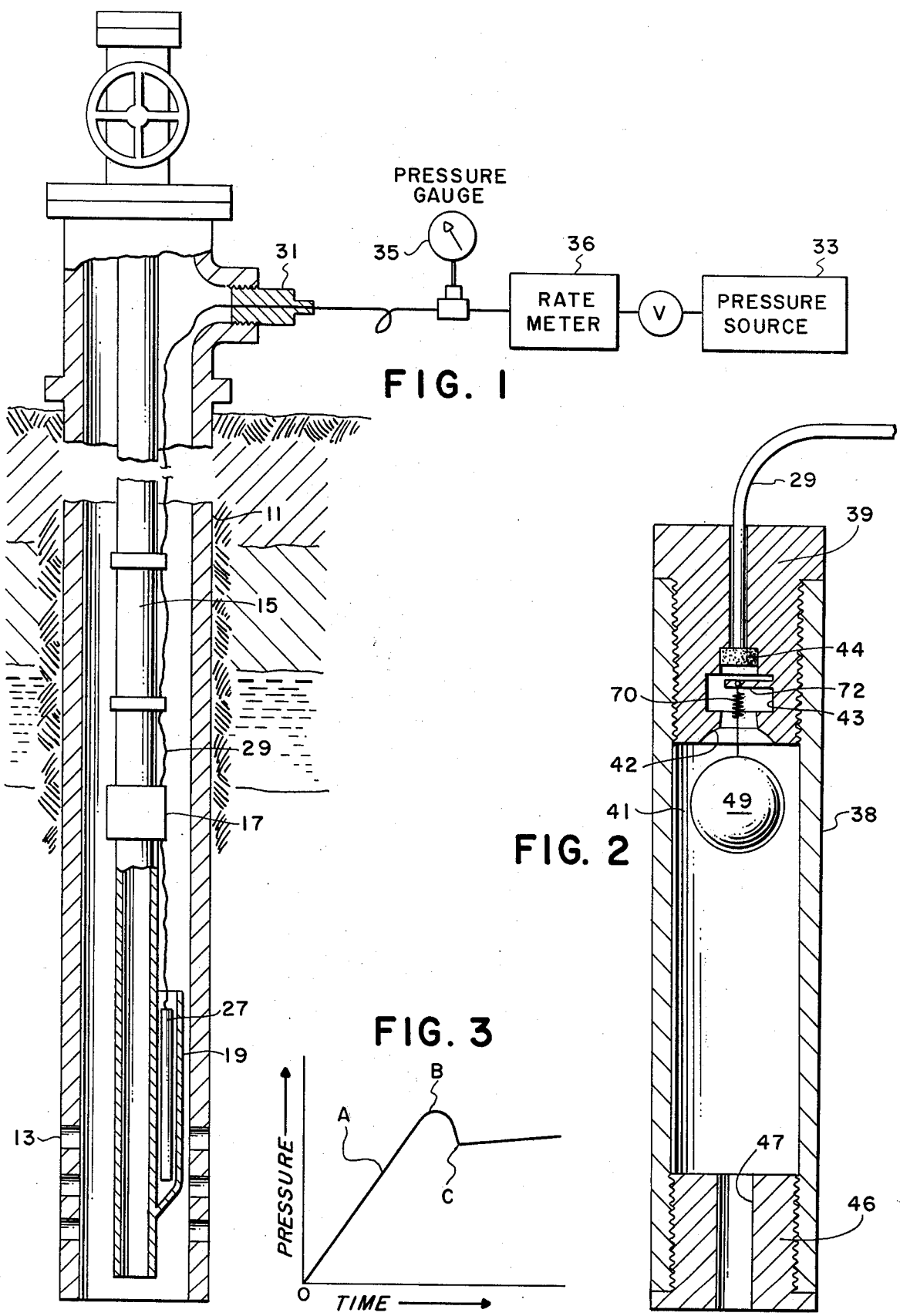

BOREHOLE PRESSURE MEASUREMENT APPARATUS HAVING A HIGH PRESSURE FLOAT VALVE

BACKGROUND OF THE INVENTION

1. Field of the Invention

The invention relates to the remote measurement of fluid pressures, and more particularly to apparatus for such measurement in boreholes having high pressures.

2. Technical Considerations

There are many situations in which it is desirable to measure changes in pressure in the relatively inaccessible environment of a borehole. A very obvious and important application for such devices is in wells producing a fluid from underground formations in which the pressure is a factor, such as oil and gas producing wells.

In the analysis of most production and reservoir engineering problems, reliable reservoir pressure data together with other basic production and geological data is essential. In recent years the oil industry has through extensive research efforts developed many methods and techniques for utilizing pressure data in evaluating problems of petroleum production. For example, reliable bottom-hole pressure information is essential to implement and maintain secondary recovery operations. In such operations periodic pressure observations are used to determine fill-up requirements, location of flood fronts, sweep efficiencies, well productivity potential, etc. In addition, bottom-hole pressure measurements are used to determine the occurrence of wellbore damage and operational problems in pumping wells.

PRIOR ART

Heretofore, bottom-hole pressure data has generally been provided on a periodic basis by running pressure instruments into the borehole. Oftentimes it is inconvenient and very expensive to take data in this manner since the well must normally be shut in or producing equipment removed to facilitate the running in of instrumentation for taking the pressure data. In order to overcome these problems, permanent pressure measuring devices have been devised for installation in producing wells. One such device operates with a downhole pressure transducer having an electronic scanning system for converting the downhole pressure into data transmittable to the surface by means of a conductor cable. The cable is normally applied or attached to the outside of the tubing with the transducer being mounted on the lower end of the tubing string. The electronics in such a system is expensive and is difficult to maintain. In addition, an electronic system using scanners and transmitting such data over conductors is subject to problems of maintaining a high resolution, thereby possibly reducing the accuracy of the data to a level below that needed to determine changes in reservoir conditions. Other problems are that the conductor cable deteriorates with time and is often subject to chemical reaction with wellbore fluids; and the temperature limitations of electronic instrumentation are sometimes exceeded in deep or high temperature wells.

Downhole pressure transducers are often intricate in design, and of course, are subject to the hostile pressure, temperature and chemical fluid environment of wellbores. For this reason, simplicity of design is an important factor in the efficient and lasting operation of pressure measuring devices.

The present applicant previously disclosed a system to overcome these problems in U.S. Pat. No. 3,895,527. This patent discloses a pressure measurement system for use in boreholes that includes generally a chamber having an open lower end and that is in fluid communication through a microtube with a pressure source on the surface. In the general operation of the device, a fluid is injected by the pressure source through the microtube into the chamber at an increasing rate of pressure, and the rate of pressure increase in the microtube is monitored by a gauge at the surface as a function of time. Whenever the pressure of the injected fluid reaches that of the borehole fluid, the borehole fluid begins to be expelled from the chamber through the opening on its lower end. Whenever this occurs, the rate of pressure increase measured by the gauge at the surface decreases. Thus, by observing the rate of pressure increase in the microtube the bottom hole pressure can be measured. In addition, the microtube can be sealed to prevent escape of the injected fluid and variations in the borehole pressure can be read continuously from the surface pressure gauge.

The chamber in the previous device includes a ball float that moves between upper and lower seats to seal respectively the microtube to the surface and the opening to the external borehole environment respectively as the level of fluid rises and lowers in the chamber. This ball prevents both the entry of borehole fluids into the microtube and the loss of injected fluid through the opening in the lower end of the chamber. The upper seal is particularly important since the entry of water and trash can clog the microtube. The water alone can be expelled from the tube but a great deal of gas is required to displace it and to dry the tube out.

The design of the ball float check valve is complicated when extremely high pressures are encountered. A float designed for normal pressures may be crushed and thereby rendered ineffective as a seal under such conditions.

SUMMARY OF THE INVENTION

In accordance with the invention, a borehole pressure measurement apparatus of the type having a chamber with one end open to the borehole fluids and the other end in fluid communication with a pressure source on the surface through a microtube is provided with a high strength material and in a manner sufficient to withstand high pressure fluids without collapse, is buoyantly pushed into a seat by borehole fluids as they rise inside the chamber to seal the opening to the microtube. Loss in buoyancy due to the high strength design of the float is compensated by a spring attached between the chamber and the float.

BRIEF DESCRIPTION OF THE DRAWINGS

The invention may be more fully understood when the appended detailed description is read in conjunction with the following drawings, wherein:

FIG. 1 is a schematic drawing of a wellbore and production equipment including a pressure measuring system in accordance with the present invention;

FIG. 2 shows a downhole pressure probe for use in the system of FIG. 1 and embodying the present invention;

and

FIG. 3 is a graph of pressure as a function of time observed in the operation of the system of FIGS. 1 and 2.

DETAILED DESCRIPTION OF THE INVENTION

Referring to FIG. 1, a wellbore is shown extending into the underground formations. Production equipment for producing fluids from the formation is shown schematically and includes a casing 11 in the wellbore having perforations 13 at its lower end to permit the entry of formation fluids. A tubing string 15 extends from the wellhead at the surface downwardly within the borehole to the lower end thereof. Spacers 17 are provided in the tubing string to maintain the tubing centered in the wellbore. A mandrel 19 is shown attached to the lower end of the tubing to provide a seat for a downhole pressure probe 27. The mandrel is open to permit the entry of wellbore fluids. The downhole pressure measuring probe 27 is shown positioned in the mandrel at the lower end of the tubing. A small diameter hollow tube 29 extends from within the pressure measuring probe. The tube is positioned on the outside of the tubing string and extends to the surface where it exits from the side of the wellhead through a fitting 31. Connected to the tube 29 at the surface is a fluid pressure source 33 and a pressure indicating device 35. A rate meter 36 is shown in the system to measure the rate of pressure change when pressure is applied to the system. The rate may be determined by any sort of device that detects pressure as a function of time. Thus, as pressure is charted versus time or printed out in a timed sequence, this will serve to establish the rate of pressure change.

Referring to FIG. 2, an embodiment of the downhole probe 27 is shown in greater detail. The probe includes a housing 38 having a plug 39 into communication with a chamber 41 within the housing. The bottom surface of plug 39 has a concave surface 42 with a recess 43 centered therein. A metallic screen 44 is positioned in the recess where it connects with the tube 29. At the lower end of housing 38 is another plug 46 which has a central opening 47 to permit the entry of borehole fluids in the chamber 41. The concave surface 42 is shaped to sealingly mate with the surface of a ball 49 positioned within chamber 41. The ball 49 is made such that it has sufficient strength to withstand extremely high borehole pressures on the order of 10,000 psi. The extra strength of the ball 49 may make the ball denser than the borehole fluids and thus unable to be buoyantly supported thereby. To compensate for this, ball 49 is supported by a spring, or the like, 70 which is attached to the ball 49 and extends into recess 43 where it is attached to a support member 72. Spring 70 provides sufficient support to make the effective density of the ball less than the borehole fluids. Thus, as borehole fluids enter chamber 41, the ball engages surface 42 on plug 39 and closes the recess 43. This prevents the entry of borehole fluids into tube 29 during the running-in procedure and thus keeps particles which may be in such fluids from clogging tube 29. The screen 44 also acts to filter out any such particles. Ball 49 also prevents the entry of borehole fluids which in combination with these particles can compound the clogging problem.

The installation of the apparatus thus far described is accomplished as follows: The tubing 15 is withdrawn from the borehole, and the probe 27 is positioned within mandrel 19 attached to the lower section of tubing. Tube 29 is then attached to the probe and positioned on the outside of the tubing as it is fed into the borehole from the surface. Tube 29 may be fixed to the outside of the tubing as by clamping, banding, etc. The process is continued until the tubing extends into the borehole to the desired depth. The upper end of the casing 11 is shut in at the wellhead and the system is ready for operation. During the running of the tube 29, fluid density in the borehole is sufficient to float the ball 49 into engagement with surface 42 to seal off the tube from the entry of borehole fluids. The differential pressure between the borehole environment and surface pressure in the tube thereafter maintains the ball in its seated position.

In the operation of the apparatus thus far described, pressure is first applied to the upper end of the tube as at 33 and is increased at a substantially constant rate. This is continued until ball 49 moves away from surface 42 at which time the pressure in the tube exceeds pressure in the borehole. and the fluid in the tube begins to displace the fluid in chamber 41.

Referring to FIG. 3, observation of the rate of pressure increase will show a fairly constant rate of increase (Point A) until this point of excess pressure in the tube (Point B) has been reached, assuming the pressure has been applied to the tube at a fairly constant rate. When the ball is unseated, the pressure in the tube equalizes with the bottom hole pressure (Point C). However, when bottom hole pressure is reached the pressure will increase only very slightly. The further application of pressure to the tube is then ceased and the system is locked in at this pressure. Thereafter any changes in the downhole pressure will cause a proportionate pressure change at the surface which is detected at pressure gauge 35. Sufficient pressure over and above downhole pressure is preferably applied to the system before the pressure is lockedin to provide a range pressure increase so that the ball 49 will not be seated to close off passageway 29 and thus prevent further pressure increases from being transmitted to the surface. The pressure should be locked in at a point where a suspected pressure range can be measured without the system closing off.

While particular embodiments of the present invention have been shown and described, it is apparent that changes and modifications may be made therein without departing from its true scope and spirit. It is therefore the intention in the appended claims to cover all such changes and modifications.

What is claimed is:

1. Borehole pressure measurement apparatus, comprising:
    a pressure source at the surface;
    a microtube in fluid communication with the pressure source and extending into the borehole;
    a chamber positioned in said borehole in the area where pressure is to be measured and in fluid communication with the microtube on its upper side,
    said chamber being open on its lower end to the entry of borehole fluids and having a float positioned in said chamber to close the opening to said microtube when buoyantly supported by the borehole fluids; and
    flexible means for partially supporting the weight of the float when said float is in contact with borehole fluid.

2. Borehole pressure measurement apparatus in accordance with claim 1 wherein the flexible means comprises a spring.

3. Apparatus for measuring the pressure of fluids in a borehole, comprising:
   means for supplying a pressurized fluid to the area in which the pressure is to be measured;
   a chamber in fluid communication with the supplying means on its upper end and having an open lower end;
   a float in the chamber positioned to close the opening to said supplying means when buoyantly supported by borehole fluids, and
   flexible means for partially supporting the weight of the float when said float is in contact with borehole fluid.

4. Apparatus for measuring the fluid pressure of a borehole in accordance with claim 3 wherein the flexible means comprises a spring.

5. In a borehole pressure measurement system:
   a chamber in a borehole in fluid communication with the surface,
   said chamber having an open lower end and a closed upper end;
   means inside the chamber for sealing said chamber from fluid communications with the surface when said means is in contact with borehole fluid,
   said sealing means having a density greater than that of borehole fluids; and
   flexible means for partially supporting said sealing means when said sealing means is in contact with borehole fluid to decrease the effective density of said sealing means to slightly less than that of borehole fluids.

6. Apparatus in according with claim 5 wherein the supporting means comprises a spring.

7. In a borehole pressure measurement system including means for supplying a pressurized fluid to the area in which the pressure is to be measured, a chamber in fluid communication with the supplying means on its upper end and having an open lower end, a float in the chamber positioned to close the opening to said supplying means when buoyantly supported by borehole fluids, the improvement comprising:
   means for partially and suspensively supporting said float below said opening to said supplying means when said float is in contact with borehole fluid to decrease the effective density of said float to slightly less than that of the borehole fluids.

* * * * *